(12) United States Patent
Wagner (10) Patent No.: US 12,090,980 B2
(45) Date of Patent: Sep. 17, 2024

(54) BRAKE PEDAL EMULATOR

(71) Applicant: CTS Corporation, Lisle, IL (US)

(72) Inventor: Ryan Andrew Wagner, Goshen, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 17/929,992

(22) Filed: Sep. 6, 2022

(65) Prior Publication Data

US 2024/0075910 A1    Mar. 7, 2024

(51) Int. Cl.
*B60T 7/06*     (2006.01)
*G05G 5/03*    (2008.04)
*B60T 7/04*     (2006.01)

(52) U.S. Cl.
CPC .................. *B60T 7/06* (2013.01); *G05G 5/03* (2013.01); *B60T 7/042* (2013.01)

(58) Field of Classification Search
None
See application file for complete search history.

(56) References Cited

U.S. PATENT DOCUMENTS

| | | |
|---|---|---|
| 3,636,760 A | 1/1972 | Shoberg |
| 4,120,387 A | 10/1978 | Otteblad et al. |
| 4,206,636 A | 6/1980 | Hendrix |
| 4,395,883 A | 8/1983 | Melinat |
| 4,888,997 A | 12/1989 | Eckert et al. |
| 5,115,186 A | 5/1992 | Reinartz et al. |
| 5,168,750 A | 12/1992 | Kurtz |
| 5,333,706 A | 8/1994 | Mori |
| 5,335,563 A | 8/1994 | Yamamoto et al. |
| 5,350,225 A | 9/1994 | Steiner et al. |
| 5,385,068 A | 1/1995 | White et al. |

(Continued)

FOREIGN PATENT DOCUMENTS

| | | |
|---|---|---|
| CN | 201989768 U | 9/2011 |
| DE | 19781694 T1 | 3/1999 |

(Continued)

OTHER PUBLICATIONS

International Search Report for Application No. PCT/US2023/072554, dated Dec. 18, 2023 (12 pages).

(Continued)

*Primary Examiner* — Vicky A Johnson
(74) *Attorney, Agent, or Firm* — Michael Best & Friedrich LLP (57) ABSTRACT

A pedal emulator including a housing having a first housing portion that defines a first chamber and a second housing portion that defines a second chamber, the second housing portion moveable relative to the first housing portion. The pedal emulator also includes a first spring that is compressed while the second housing portion travels a first distance relative to the first housing portion, a second spring that is compressed in parallel with the first spring after the second housing travels the first distance and while the second housing portion travels a second distance relative to the first housing portion, and a third spring that is compressed in parallel with the first spring and the second spring after the second housing portion travels the second distance and while the second housing portion travels a third distance relative to the first housing portion.

18 Claims, 9 Drawing Sheets

(56) References Cited

U.S. PATENT DOCUMENTS

| | | |
|---|---|---|
| 5,416,295 A | 5/1995 | White et al. |
| 5,427,442 A | 6/1995 | Heibel |
| 5,564,797 A | 10/1996 | Steiner et al. |
| 5,590,937 A | 1/1997 | Heibel |
| 5,793,007 A | 8/1998 | Matsumoto |
| 5,839,280 A | 11/1998 | Troester et al. |
| 5,962,997 A | 10/1999 | Maisch |
| 6,008,604 A | 12/1999 | Maisch |
| 6,105,737 A | 8/2000 | Weigert et al. |
| 6,186,026 B1 | 2/2001 | Shaw et al. |
| 6,213,572 B1 | 4/2001 | Linkner, Jr. et al. |
| 6,217,131 B1 | 4/2001 | Schanzzenbach |
| 6,226,586 B1 | 5/2001 | Luckevich et al. |
| 6,238,011 B1 | 5/2001 | Heckmann |
| 6,253,635 B1 | 7/2001 | Huber |
| 6,270,172 B1 | 8/2001 | Shirai et al. |
| 6,289,762 B1 | 9/2001 | Silva |
| 6,298,746 B1 | 10/2001 | Shaw |
| 6,305,506 B1 | 10/2001 | Shirai et al. |
| 6,330,838 B1 | 12/2001 | Kalsi |
| 6,367,886 B1 * | 4/2002 | Shaw .................. B60T 8/4086 303/50 |
| 6,390,565 B2 | 5/2002 | Riddiford et al. |
| 6,405,117 B1 | 6/2002 | Allen et al. |
| 6,408,712 B1 | 6/2002 | Venkata et al. |
| 6,412,882 B1 | 7/2002 | Isono et al. |
| 6,422,658 B1 | 7/2002 | Valeriano et al. |
| 6,431,304 B1 | 8/2002 | Smythe |
| 6,450,588 B2 | 9/2002 | Grote et al. |
| 6,464,306 B2 | 10/2002 | Shaw et al. |
| 6,471,304 B1 | 10/2002 | Deml et al. |
| 6,531,667 B2 | 3/2003 | Becker et al. |
| 6,542,793 B2 | 4/2003 | Kojima et al. |
| 6,554,088 B2 | 4/2003 | Severinsky et al. |
| 6,554,744 B2 | 4/2003 | Schmidt |
| 6,571,662 B1 | 6/2003 | Kolita |
| 6,577,119 B1 | 6/2003 | Yaddehige |
| 6,580,352 B1 | 6/2003 | Pino et al. |
| 6,591,710 B1 | 7/2003 | Shaw |
| 6,619,039 B2 | 9/2003 | Zehnder, II et al. |
| 6,658,963 B2 | 12/2003 | Yaddehige |
| 6,679,135 B1 | 1/2004 | Faigle et al. |
| 6,684,987 B2 | 2/2004 | Stachowski et al. |
| 6,736,233 B2 | 5/2004 | Beishline et al. |
| 6,744,360 B2 | 6/2004 | Fulks et al. |
| 6,862,950 B2 | 3/2005 | O'Neill |
| 7,134,327 B2 | 11/2006 | Saito et al. |
| 7,198,336 B2 | 4/2007 | Yamamoto et al. |
| 7,331,256 B2 | 2/2008 | Allard et al. |
| 7,347,510 B2 | 3/2008 | Schluter |
| 7,395,734 B2 | 7/2008 | Fujiwara et al. |
| 7,401,865 B2 | 7/2008 | Shaw |
| 7,438,368 B2 | 10/2008 | Kohler et al. |
| 7,614,320 B2 | 11/2009 | Fukase |
| 7,650,212 B2 | 1/2010 | Breed et al. |
| 7,712,371 B2 | 5/2010 | Fujiwara |
| 7,726,195 B2 | 6/2010 | Truesdale et al. |
| 7,748,791 B2 | 7/2010 | Joyce |
| 7,748,792 B2 | 7/2010 | Crombez et al. |
| 7,765,893 B2 | 8/2010 | Chol |
| 7,770,491 B2 | 8/2010 | Ritter et al. |
| 7,823,985 B2 | 11/2010 | Hatano |
| 7,856,918 B2 | 12/2010 | Nen et al. |
| 8,042,430 B2 | 10/2011 | Campbell |
| 8,076,874 B2 | 12/2011 | Ueno et al. |
| 8,090,514 B2 | 1/2012 | Tarasinski et al. |
| 8,165,747 B2 | 4/2012 | Ueno et al. |
| 8,239,100 B2 | 8/2012 | Ueno et al. |
| 8,266,982 B2 | 9/2012 | Peniston et al. |
| 8,305,073 B2 | 11/2012 | Kather |
| 8,321,111 B2 | 11/2012 | Ueno et al. |
| 8,333,130 B2 | 12/2012 | Fujiwara |
| 8,340,863 B2 | 12/2012 | Karatsinides |
| 8,359,140 B2 | 1/2013 | Kodaka et al. |
| 8,496,302 B2 | 7/2013 | Fukushima |
| 8,522,640 B2 | 9/2013 | Bryce |
| 8,523,297 B2 | 9/2013 | Morishita |
| 8,596,162 B2 | 12/2013 | Nozu et al. |
| 8,634,985 B2 | 1/2014 | Zettel et al. |
| 8,635,930 B2 | 1/2014 | Willemsen et al. |
| 8,706,358 B2 | 4/2014 | DeWitt |
| 8,706,375 B2 | 4/2014 | Ajiro |
| 8,707,820 B2 | 4/2014 | Fujiwara |
| 8,726,654 B2 | 5/2014 | Cagnac et al. |
| 8,777,331 B2 | 7/2014 | Fukushima |
| 8,806,976 B1 | 8/2014 | Soltys et al. |
| 8,814,279 B2 | 8/2014 | Sekiya et al. |
| 8,833,072 B2 | 9/2014 | Sprocq et al. |
| 8,850,900 B2 | 10/2014 | Isono et al. |
| 8,874,343 B2 | 10/2014 | Anderson |
| 8,893,579 B2 | 11/2014 | Fujiwara et al. |
| 8,931,368 B2 | 1/2015 | Fujiwara et al. |
| 8,944,528 B2 | 2/2015 | Pursifull et al. |
| 9,045,017 B2 | 6/2015 | Buettner et al. |
| 9,134,748 B2 | 9/2015 | Fujiwara |
| 9,162,655 B2 | 10/2015 | Murayama et al. |
| 9,221,338 B2 | 12/2015 | Gauthier |
| 9,254,829 B2 | 2/2016 | Jeon et al. |
| 9,260,088 B2 | 2/2016 | Shand et al. |
| 9,266,507 B2 | 2/2016 | Shand et al. |
| 9,340,193 B2 | 5/2016 | Ganzel |
| 9,399,462 B2 | 7/2016 | Awadi et al. |
| 9,403,516 B2 | 8/2016 | Strengert et al. |
| 9,442,030 B2 | 9/2016 | Fujiwara et al. |
| 9,465,402 B2 | 10/2016 | Kaiser |
| 9,501,083 B2 | 11/2016 | Zhou et al. |
| 9,505,385 B2 | 11/2016 | Yasui et al. |
| 9,539,993 B2 | 1/2017 | Crombez et al. |
| 9,566,964 B2 | 2/2017 | Jurgens |
| 9,580,056 B2 | 2/2017 | Ishino et al. |
| 9,582,025 B2 | 2/2017 | Jayasuriya et al. |
| 9,592,811 B2 | 3/2017 | Deng et al. |
| 9,616,861 B2 | 4/2017 | Soltys et al. |
| 9,631,918 B2 | 4/2017 | Weiberle et al. |
| 9,651,634 B2 | 5/2017 | Kang |
| 9,676,375 B2 | 6/2017 | Matsuoka et al. |
| 9,707,950 B2 | 7/2017 | Wessner et al. |
| 9,740,233 B2 | 8/2017 | Fujiwara et al. |
| 9,804,047 B2 | 10/2017 | Pagani et al. |
| 9,815,367 B2 | 11/2017 | Maruyama et al. |
| 9,821,776 B2 | 11/2017 | Mayer |
| 9,829,402 B2 | 11/2017 | Beason et al. |
| 9,845,085 B2 | 12/2017 | Besier et al. |
| 9,963,130 B2 | 5/2018 | Tsuchiya |
| 9,989,987 B2 | 6/2018 | Fujiwara |
| 10,081,340 B2 | 9/2018 | Szymczak |
| 10,086,806 B2 | 10/2018 | Pennala et al. |
| 10,112,587 B2 | 10/2018 | Richards et al. |
| 10,124,774 B2 | 11/2018 | Kitaguchi et al. |
| 10,137,870 B2 | 11/2018 | Decker et al. |
| 10,155,505 B2 | 12/2018 | Christoff et al. |
| 10,166,954 B2 | 1/2019 | Houtman et al. |
| 10,173,661 B2 | 1/2019 | Rifici et al. |
| 10,175,712 B2 | 1/2019 | Kaijala |
| 10,239,531 B2 | 3/2019 | Kilmurray et al. |
| 10,248,152 B2 | 4/2019 | Kim et al. |
| 10,296,036 B2 | 5/2019 | Cosby et al. |
| 10,296,037 B2 | 5/2019 | Henrikson |
| 10,343,657 B2 | 7/2019 | Street et al. |
| 10,351,117 B2 | 7/2019 | Isono |
| 10,421,447 B2 | 9/2019 | Leiber et al. |
| 10,507,811 B2 | 12/2019 | Tandler et al. |
| 10,525,959 B2 | 1/2020 | Knechtges et al. |
| 10,549,737 B2 | 2/2020 | Leiber et al. |
| 2001/0052727 A1 | 12/2001 | Betts |
| 2002/0108463 A1 | 8/2002 | Shaw et al. |
| 2002/0117893 A1 * | 8/2002 | Shaw .................. B60T 8/3255 188/151 A |
| 2003/0090150 A1 | 5/2003 | Woo |
| 2004/0004393 A1 | 1/2004 | Richard |
| 2004/0040408 A1 | 3/2004 | Shaw et al. |
| 2004/0145322 A1 | 7/2004 | Trutschel et al. |
| 2004/0187625 A1 | 9/2004 | Schiel et al. |
| 2004/0251095 A1 | 12/2004 | Simard et al. |

(56) References Cited

U.S. PATENT DOCUMENTS

| | | |
|---|---|---|
| 2005/0082909 A1 | 4/2005 | Constantakis et al. |
| 2005/0217414 A1 | 10/2005 | Gibson |
| 2005/0223836 A1 | 10/2005 | Gibson |
| 2006/0027096 A1 | 2/2006 | Giering et al. |
| 2006/0064977 A1 | 3/2006 | Ohlig et al. |
| 2006/0185469 A1 | 8/2006 | Schlabach |
| 2006/0224284 A1 | 10/2006 | Ueno et al. |
| 2007/0068306 A1 | 3/2007 | Herrick et al. |
| 2007/0112473 A1 | 5/2007 | Ueno et al. |
| 2007/0159126 A1 | 7/2007 | Nobuyasu et al. |
| 2007/0193401 A1 | 8/2007 | Campbell |
| 2007/0296268 A1 | 12/2007 | Shaw et al. |
| 2008/0276749 A1 | 11/2008 | Stewart et al. |
| 2011/0041647 A1 | 2/2011 | Soltys |
| 2011/0143320 A1 | 6/2011 | McCormick et al. |
| 2013/0074634 A1 | 3/2013 | Al-Rubb |
| 2014/0060239 A1 | 3/2014 | Hemmege Venkatappa et al. |
| 2014/0360177 A1 | 12/2014 | Ryu et al. |
| 2015/0001915 A1 | 1/2015 | Murayama et al. |
| 2015/0001917 A1 | 1/2015 | Murayama et al. |
| 2015/0001918 A1 | 1/2015 | Murayama et al. |
| 2016/0016569 A1 | 1/2016 | Odaira et al. |
| 2017/0001615 A1 | 1/2017 | Adler et al. |
| 2017/0067228 A1 | 3/2017 | Hagman |
| 2017/0225664 A1 | 8/2017 | Beever |
| 2017/0334344 A1 | 11/2017 | Salter et al. |
| 2017/0351291 A1 | 12/2017 | Schoenfuss et al. |
| 2018/0043866 A1 | 2/2018 | Monsere et al. |
| 2018/0056963 A1 | 3/2018 | Krueger et al. |
| 2018/0093648 A1* | 4/2018 | Pennala .................. B60T 7/06 |
| 2018/0126966 A1 | 5/2018 | Crum |
| 2018/0141530 A1 | 5/2018 | Kilmurray et al. |
| 2018/0208163 A1 | 7/2018 | Lee et al. |
| 2018/0253121 A1 | 9/2018 | Stuart et al. |
| 2018/0257656 A1 | 9/2018 | Zhao et al. |
| 2018/0259407 A1 | 9/2018 | Hardy et al. |
| 2018/0283967 A1 | 10/2018 | Kato |
| 2018/0290640 A1 | 10/2018 | Johnson et al. |
| 2018/0370515 A1 | 11/2018 | Kim |
| 2018/0356853 A1 | 12/2018 | Suntharalingam |
| 2019/0092298 A1 | 3/2019 | Bach et al. |
| 2019/0100137 A1 | 4/2019 | Wolf-Monheim |
| 2019/0121385 A1 | 4/2019 | Lee |
| 2019/0271570 A1 | 9/2019 | Zhao et al. |
| 2019/0308597 A1 | 10/2019 | Seibert |
| 2019/0350757 A1 | 11/2019 | Charles |
| 2019/0359194 A1 | 11/2019 | Bindl et al. |
| 2020/0001711 A1 | 1/2020 | Burke et al. |
| 2020/0003300 A1 | 1/2020 | Yang |
| 2020/0025113 A1 | 1/2020 | Glugla et al. |
| 2020/0353908 A1 | 11/2020 | Street et al. |
| 2022/0219659 A1 | 7/2022 | Wagner et al. |
| 2022/0314939 A1 | 10/2022 | Wagner |
| 2023/0114657 A1 | 4/2023 | Wagner et al. |

FOREIGN PATENT DOCUMENTS

| | | |
|---|---|---|
| DE | 19755481 A1 | 6/1999 |
| DE | 19825231 A1 | 12/1999 |
| DE | 19510522 C2 | 2/2000 |
| DE | 19836692 A1 | 2/2000 |
| DE | 10043255 A1 | 3/2002 |
| DE | 10341277 A1 | 3/2005 |
| DE | 10347838 A1 | 3/2005 |
| DE | 10347843 A1 | 4/2005 |
| DE | 102004023007 A1 | 12/2005 |
| DE | 102004041733 B4 | 7/2006 |
| DE | 102005033179 A1 | 1/2007 |
| DE | 202007000827 U1 | 4/2007 |
| DE | 102006001683 A1 | 7/2007 |
| DE | 102007018962 A1 | 10/2008 |
| DE | 102007030312 A1 | 1/2009 |
| DE | 102007035326 A1 | 1/2009 |
| DE | 102010000882 A1 | 7/2010 |
| DE | 202010008405 U1 | 12/2010 |
| DE | 102009055251 A1 | 6/2011 |
| DE | 102010024735 A1 | 12/2011 |
| DE | 102011106396 A1 | 4/2012 |
| DE | 102010061439 A1 | 6/2012 |
| DE | 102011016239 A1 | 10/2012 |
| DE | 102011117264 A1 | 11/2012 |
| DE | 102012024846 A1 | 8/2013 |
| DE | 102013204778 A | 9/2013 |
| DE | 102012106213 A1 | 1/2014 |
| DE | 102013106654 A1 | 1/2015 |
| DE | 102016201784 A1 | 9/2016 |
| DE | 202016106697 U1 | 3/2017 |
| DE | 102004013868 B4 | 8/2017 |
| DE | 102016212931 A1 | 1/2018 |
| DE | 102007047547 B4 | 2/2018 |
| DE | 102016116619 A1 | 3/2018 |
| DE | 102016219219 A1 | 4/2018 |
| DE | 102016219622 B4 | 6/2018 |
| DE | 102018100072 A1 | 8/2018 |
| DE | 102017104278 A1 | 9/2018 |
| DE | 102017004518 A1 | 11/2018 |
| DE | 102017211955 A1 | 1/2019 |
| DE | 102017218384 A1 | 4/2019 |
| DE | 112017004866 T5 | 6/2019 |
| DE | 102008026751 B4 | 3/2020 |
| EP | 0136689 A2 | 4/1985 |
| EP | 0136690 A2 | 4/1985 |
| EP | 0301018 B1 | 6/1992 |
| EP | 0786387 A2 | 7/1997 |
| EP | 1055912 A2 | 11/2000 |
| EP | 1577184 A2 | 9/2005 |
| EP | 1078833 B1 | 11/2005 |
| EP | 1394007 B1 | 8/2007 |
| EP | 1654137 B1 | 10/2008 |
| EP | 1781516 B1 | 6/2010 |
| EP | 2806255 A2 | 11/2014 |
| EP | 2818444 A1 | 12/2014 |
| EP | 2871102 A1 | 5/2015 |
| EP | 2879924 A1 | 6/2015 |
| EP | 2826680 B1 | 2/2016 |
| EP | 3213168 B1 | 7/2018 |
| EP | 2731838 B1 | 9/2018 |
| EP | 3375678 B1 | 2/2020 |
| EP | 2926090 B1 | 3/2020 |
| EP | 3589518 B1 | 4/2021 |
| GB | 2451559 A | 2/2009 |
| JP | H08150263 A | 6/1996 |
| WO | WO2001001066 A1 | 1/2001 |
| WO | 2001040038 A1 | 6/2001 |
| WO | WO20160186979 A1 | 11/2016 |
| WO | 2017202512 A1 | 11/2017 |
| WO | WO2018029472 A1 | 2/2018 |
| WO | WO20180104740 A1 | 6/2018 |

OTHER PUBLICATIONS

International Search Report and Written Opinion for Application No. PCT/US2022/012012 dated May 3, 2022 (17 pages).

International Search Report and Written Opinion for Application No. PCT/US2022/077796 dated Jan. 25, 2023 (13 pages).

ams: New Magnetic Position Sensors for automotive applications Support Full ISO26262 Compliance and Provide SysteminPackage (SiP) Format. Business Wire-2016; https://dialog.proquest.com/professional/docview/1784083696/15CC904FA1C11CA0C95/123?accountid=157282 (3 pages).

Chinese Patent Office Action for Application No. 202080033525.9 dated Feb. 4, 2024 (9 pages).

* cited by examiner

BRAKE PEDAL EMULATOR

FIELD

This present disclosure relates to pedal emulators for vehicles.

BACKGROUND

Brake-by-wire vehicle brake pedals do not utilize a conventional connection to the other components of a braking system, for example, a mechanical connection to a vacuum or hydraulic brake system. In some brake-by-wire systems, a sensor monitors how far a driver has pushed the brake pedal. This distance is used to determine the amount of braking force requested. A control unit or computer then determines how much hydraulic pressure is required, and an electric pump is used to generate that pressure and, for example, cause calipers to push on a brake disc to stop the vehicle.

SUMMARY

Brake-by-wire systems have a number of advantages. However, brake-by-wire systems lack the "feel" of conventional brake systems that drivers are accustomed to. Accordingly, a pedal emulator that is reliable, compact, relatively inexpensive to manufacture, and capable of replicating the "feel" of a conventional brake pedal system is desired.

Aspects of the present disclosure are directed to, among other things, systems and methods for emulating the feel of a traditional brake pedal.

One example provides a pedal emulator for a vehicle, the pedal emulator including a housing including a first housing portion that defines a first chamber and a second housing portion that defines a second chamber, the second housing portion moveable relative to the first housing portion. The pedal emulator further includes a first spring that is compressed while the second housing portion travels a first distance relative to the first housing portion, a second spring that is compressed in parallel with the first spring after the second housing travels the first distance and while the second housing portion travels a second distance relative to the first housing portion, and a third spring that is compressed in parallel with the first spring and the second spring after the second housing portion travels the second distance and while the second housing portion travels a third distance relative to the first housing portion.

Another aspect provides a brake pedal assembly for a vehicle, the brake pedal assembly including a brake pedal, a bracket, a pedal arm rotatably coupled between the brake pedal and the bracket, the pedal arm arranged to rotate in response to application of a force to the brake pedal, and a pedal emulator that is compressed by the pedal arm as the pedal arm rotates. The pedal emulator includes a housing including a first housing portion and a second housing portion arranged to travel relative to the first housing portion when the pedal arm rotates, a first spring that is compressed while the second housing portion travels a first distance relative to the first housing portion, a second spring that is compressed in parallel with the first spring after the second housing travels the first distance and while the second housing portion travels a second distance relative to the first housing portion, and a third spring that is compressed in parallel with the first spring and the second spring after the second housing portion travels the second distance and while the second housing portion travels a third distance relative to the first housing portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples.

The apparatus and method components have been represented where appropriate by conventional symbols in the drawings, showing only those specific details that are pertinent to understanding the examples, instances, and aspects illustrated so as not to obscure the disclosure with details that will be readily apparent to those of ordinary skill in the art having the benefit of the description herein.

DETAILED DESCRIPTION

Figure 1:
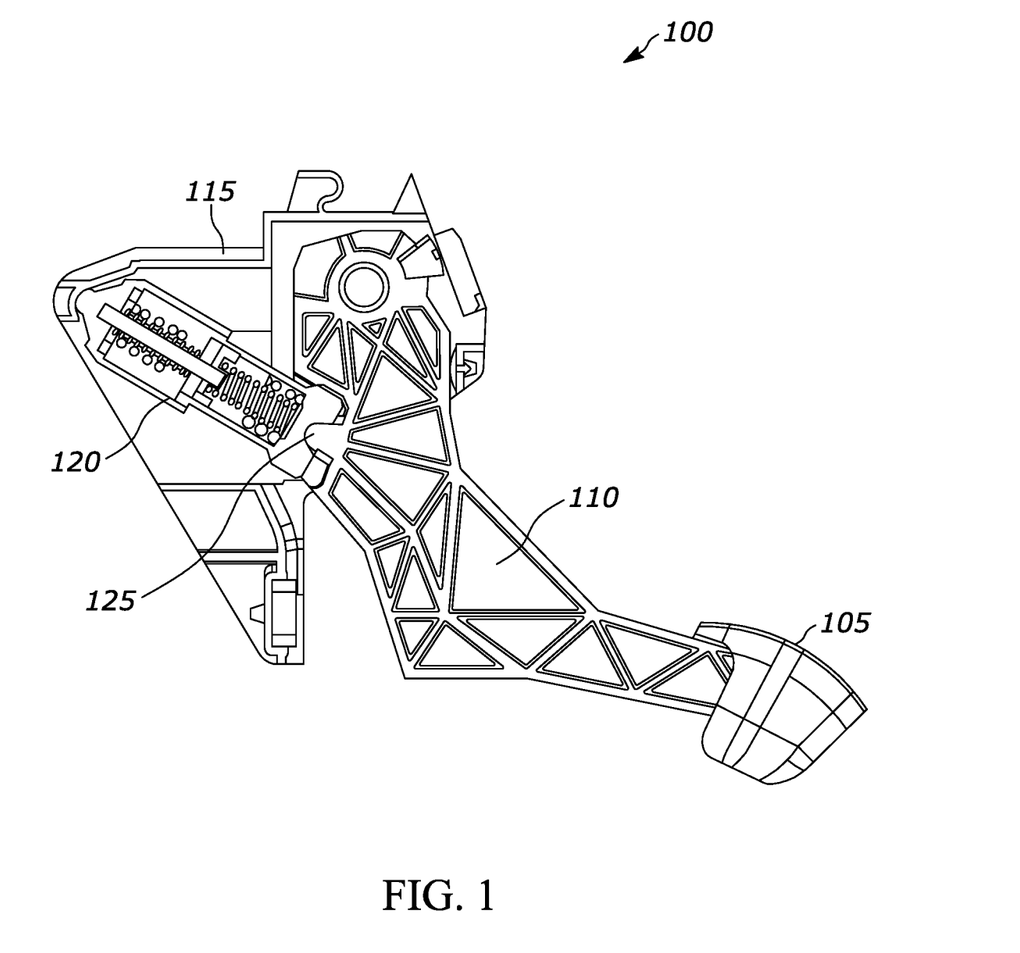
FIG. 1 is a cross-section view of a brake pedal assembly in a relaxed state, according to some examples.
Figure 2:
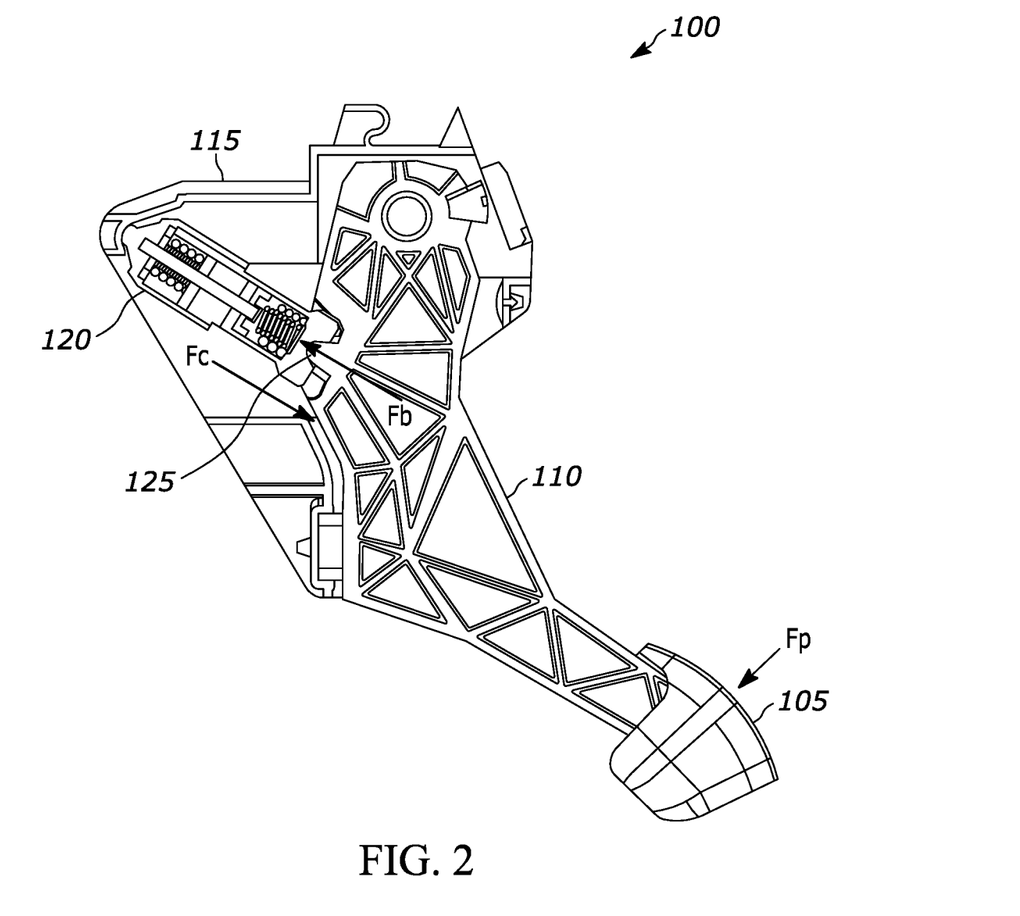
FIG. 2 is a cross-section view of a brake pedal assembly in an operated state, according to some examples.

FIGS. 1 and 2 illustrate cross-sectional views of a brake pedal assembly 100 according to some aspects. The brake pedal assembly 100 includes, among other things, a brake pedal 105 that is coupled to an end of a pedal arm 110. The pedal arm 110 is rotatably coupled to a bracket 115 included in the brake pedal assembly 100, such that the pedal arm 110 rotates relative to the bracket 115 when a brake pedal force $F_p$ is applied to the brake pedal 105. FIG. 1 illustrates the brake pedal assembly 100 in a relaxed state in which no brake pedal force $F_p$ has been applied to the brake pedal 105. FIG. 2 illustrates the brake pedal assembly 100 in an operated or braking state in which a brake pedal force $F_p$ has been applied to the braked pedal 105, thereby causing rotation of the of the pedal arm 110 relative to the bracket 115.

Figure 3:
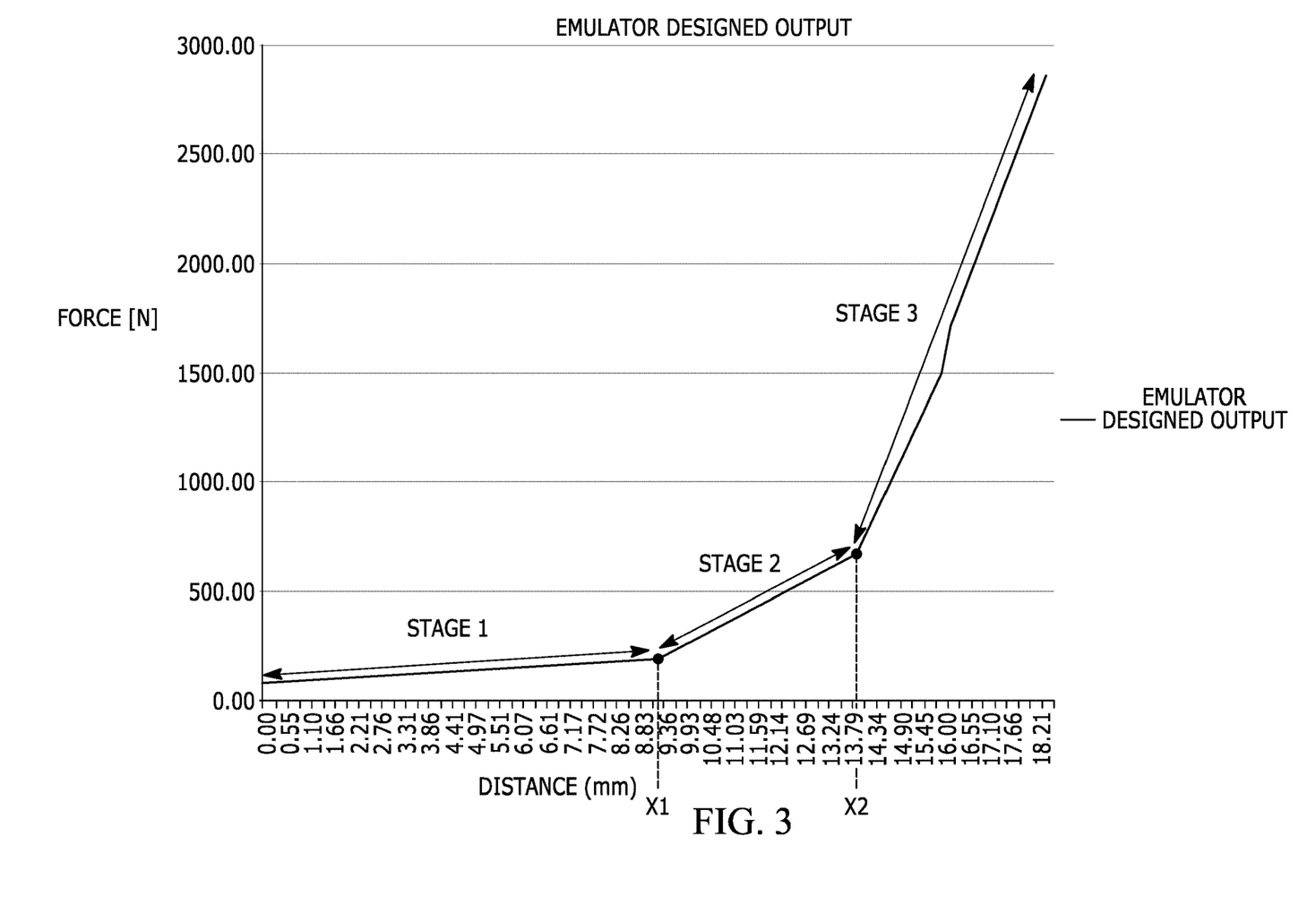
FIG. 3 is a graph illustrating the force-displacement curve of a pedal emulator, according to some examples.

As also shown in FIGS. 1 and 2, the brake pedal assembly 100 is operatively coupled to a pedal emulator 120 that is designed to replicate the feel of a conventional braking system. As will be described in more detail below, the pedal emulator 120 is linearly compressed in response to the application of a brake pedal force $F_p$ to the braked pedal 105. For example, when a brake pedal force $F_p$ is applied to the brake pedal 105, the pedal arm 110 rotates and engages, by an actuating member 125, the pedal emulator 120. As the pedal arm 110 rotates, the actuating member 125 imparts a braking force $F_b$, which is proportional to the brake pedal force $F_p$, onto the pedal emulator 120 thereby causing the pedal emulator 120 to compress. As the pedal arm 110 rotates and applies the braking force $F_b$ onto the pedal emulator 120, the pedal emulator 120 compresses and produces a counter-force $F_c$ that resists the rotation of the pedal arm 110. That is, the pedal emulator 120 produces a counter-force $F_c$ that replicates the feel of a traditional braking system when a brake pedal force $F_p$ is applied to the brake pedal 105. FIG. 3 illustrates an example force curve 300 of the force output of pedal emulator 120 versus the linear compression of the pedal emulator 120.

Figure 4:
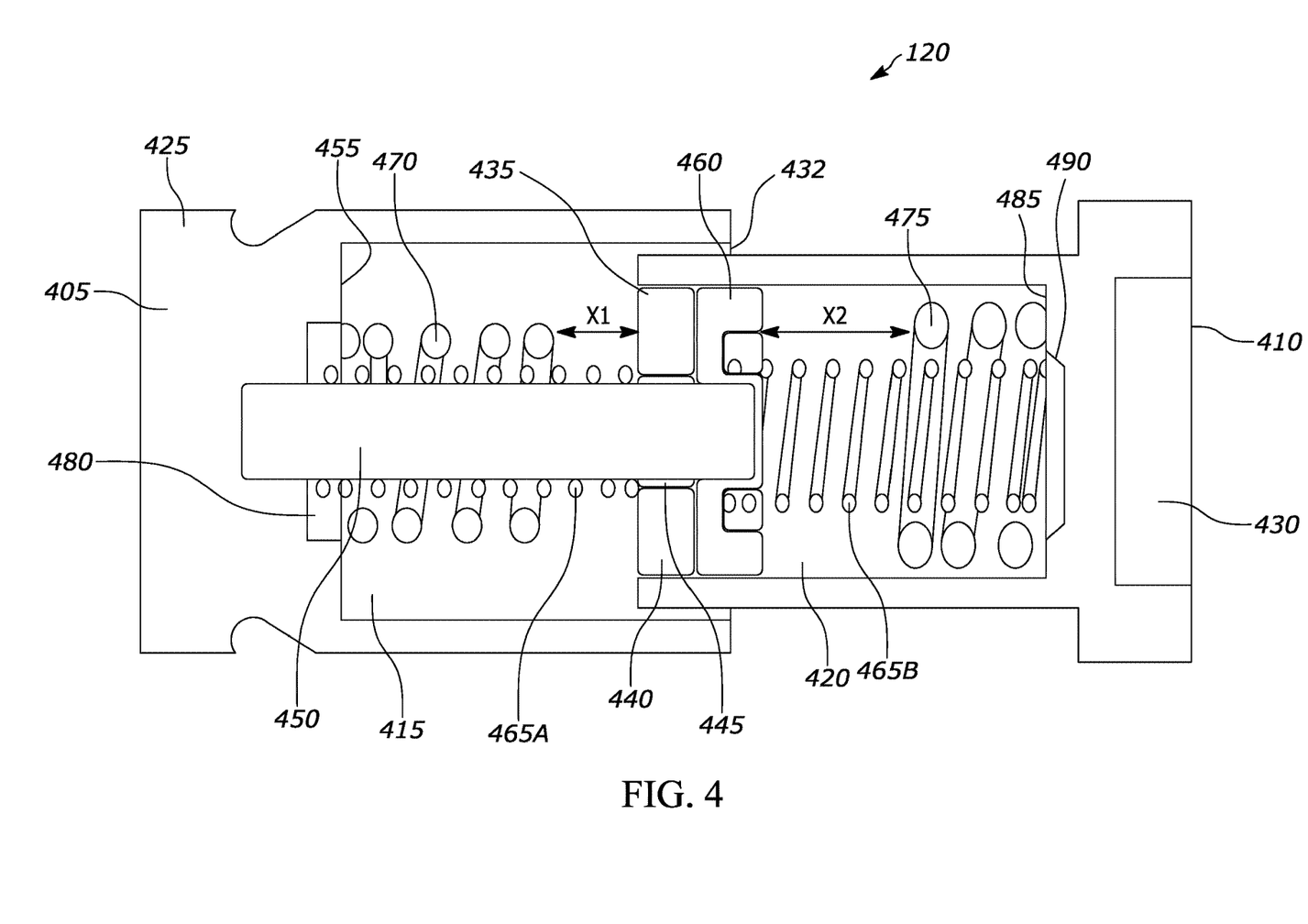
FIG. 4 is a cross-section view of a pedal emulator in an uncompressed state, according to some examples.
Figure 5:
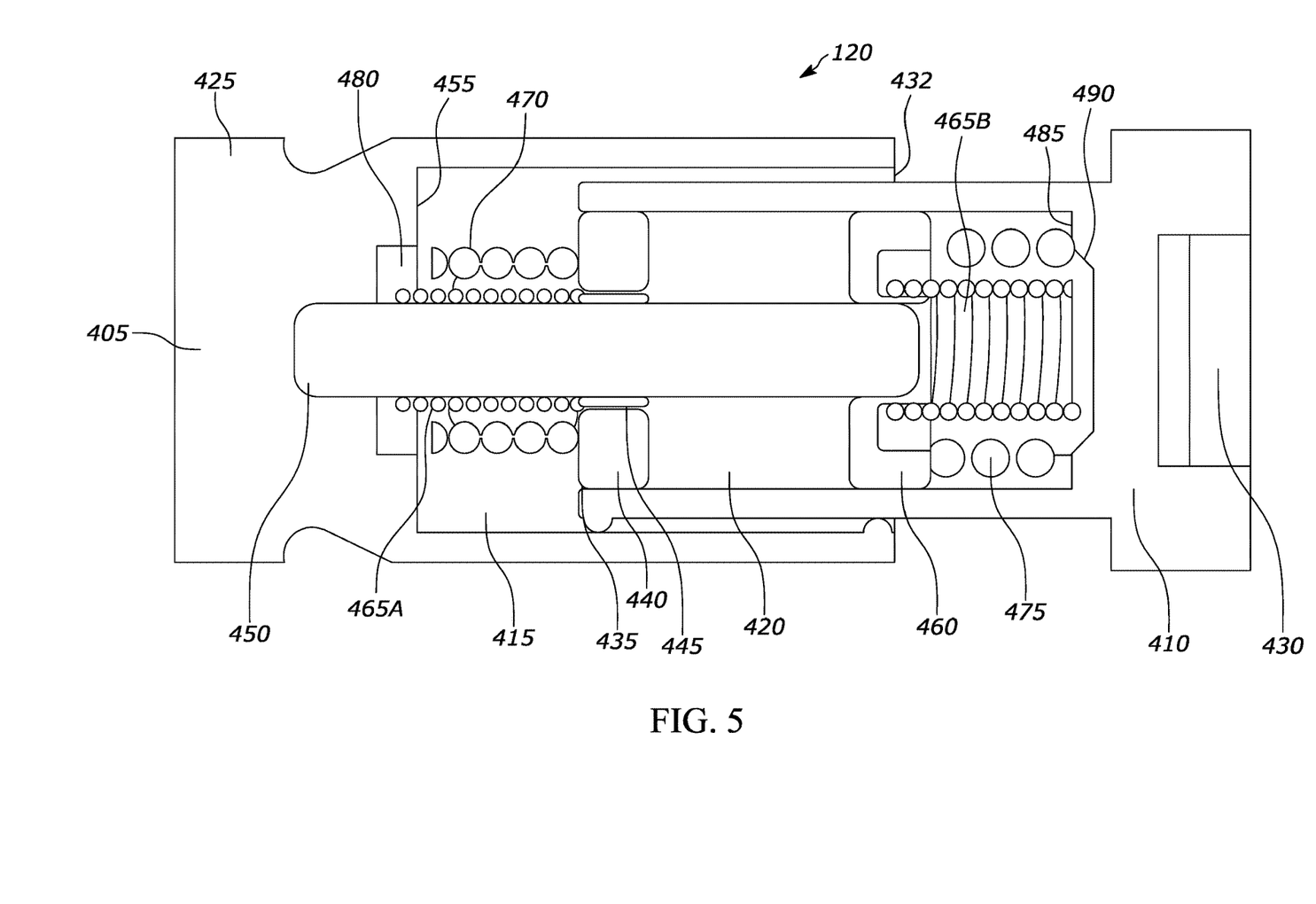
FIG. 5 is a cross-section view of a pedal emulator in a compressed state, according to some examples

FIGS. 4 and 5 illustrate cross-sectional views of the pedal emulator 120 according to some aspects. FIG. 4 illustrates a cross-sectional view in which the pedal emulator 120 is in a fully relaxed, or uncompressed, state and FIG. 5 illustrates a cross-sectional view in which the pedal emulator 120 is in a compressed state. The pedal emulator 120 includes, among other things, a cylindrical housing having a first, or outer, housing portion 405 and a second, or inner, housing portion 410 that is operable to move relative to the outer housing portion 405. The outer housing portion 405 defines a first cylindrical chamber 415 and the inner housing portion 410 defines a second cylindrical chamber 420. When the pedal emulator 120 is in the relaxed state (FIG. 4), the inner housing portion 410 extends almost fully outwards from the first chamber 415 of the outer housing portion 405. However, as shown in FIG. 5, the inner housing portion 410 slides into the first chamber 415 when the pedal emulator 120 is in a compressed state. The diameter of the first chamber 415 is larger than the diameter of the inner housing portion 410 such that the inner housing portion 410 is received by the first chamber 415 during compression of the pedal emulator 120.

In operation, the outer housing portion 405 is secured to the bracket 115 such that the outer housing portion 405 is stationary relative to the brake pedal assembly 100. For example, the outer housing portion 405 includes a shroud 425 or similar structure that is used to mount the outer housing portion 405 to the bracket 115. In contrast, the inner housing portion 410 is coupled with the pedal arm 110 such that rotation of the pedal arm 110 causes movement of the inner housing portion 410 relative to the brake pedal assembly 100. In the illustrated example, the actuating member 125 of the pedal arm engages a notch 430 formed in the inner housing portion 410 thereby causing linear movement of the inner housing portion 410 as the pedal arm 110 rotates. Accordingly, when a brake pedal force $F_p$ is applied to the brake pedal 105, rotation of the pedal arm 110 forces the inner housing portion 410 to compress, or slide, into the first chamber 415 of the outer housing portion 405 (FIG. 2).

As shown in FIGS. 4 and 5, the inner housing portion 410 is received by the open end 432 of the first housing portion 405. As further shown in FIGS. 4 and 5, the open end 435 of the second chamber 420 is sealed with a gland 440. An aperture formed in the center of the gland 440 is fitted with a bushing 445 that is arranged to receive a piston shaft 450. A first end of the piston shaft 450 is coupled to the closed end 455 of the first chamber 415 and a second end of the piston shaft 450 extends through the bushing 445 into the second chamber 420. That is, the piston shaft 450 extends longitudinally through the length of the first chamber 415 and through the bushing 445 into the second chamber 420. The second end of the piston shaft 450, which extends into the second chamber 420, is fitted with a piston cap 460. When the pedal emulator 120 is in the relaxed, or uncompressed, state (FIG. 4), the piston cap 460 abuts against the gland 440. However, as the pedal emulator 120 is compressed and the inner housing portion 410 slides into the first chamber 415, the gland 440 becomes linearly displaced from the piston cap 460 (FIG. 5). That is, the gland 440 slides along the piston shaft 450 away from the piston cap 460 and further into the first chamber 415 as the braking force $F_b$ is applied to the pedal emulator 120.

The pedal emulator 120 also includes a spring system that is contained within the first and second chambers 415, 420 of the cylindrical housing. In the illustrated example, the spring system includes two first stage springs 465A, 465B, a second stage spring 470, and a third stage spring 475. As will be described in more detail below, the springs 465A, 465B, 470, and 475 are connected in a quasi-parallel arrangement meaning that one or more of the springs are compressed in parallel at a given time as the pedal emulator 120 is compressed by the pedal arm 110. When the spring system is compressed during operation of the brake pedal assembly 100, the pedal emulator 120 generates a counter-force $F_c$ that follows the force curve 300 illustrated in FIG. 3.

The first stage spring 465A and the second stage spring 470 are disposed within the first chamber 415 defined by the outer housing portion 405. In one aspect, the first stage spring 465A and the second stage spring 470 are arranged coaxially around the piston shaft 450 within the first chamber 415. In the illustrated example, the diameter of the second stage spring 470 is larger than the diameter of the first stage spring 465A such that the second stage spring 470 also coaxially surrounds the first stage spring 465A. The relaxed, or uncompressed, length of the first stage spring 465A is longer than the relaxed length of the second stage spring 470. As shown, when the pedal emulator 120 is in a relaxed, or uncompressed, state (FIG. 4), the first stage spring 465A is held in place between the gland 440 and the closed end 455 of the first chamber 415. That is, a first end of the first stage spring 465A abuts against the closed end 455 of the first chamber 415 and a second end of the first stage spring 465A abuts against the gland 440 while the pedal emulator 120 is in the relaxed state. As a result, no mechanical fasteners or adhesives are needed to hold the first stage spring 465A in place within the first chamber 415. Accordingly, less components can be used to construct the pedal emulator 120 thereby reducing the cost and complexity of manufacturing the pedal emulator 120.

However, unlike the first stage spring 465A, the second stage spring 470 is not long enough to contact both the closed end 455 of the first chamber 415 and the gland 440 while the pedal emulator 120 is in the relaxed state. Instead, as shown in FIG. 4, a first end of the second stage spring 470 is held in place by a first retainer 480 at the closed end 455 of the first chamber 415 while a second end of the second stage spring 470 is spaced apart from the gland 440 by a first distance $X_1$. Accordingly, and as will be described in more detail below, the gland 440 travels the first distance $X_1$ during compression of the pedal emulator 120 before the second stage spring 470 is engaged by the gland 440. In some instances, the first retainer 480 is coupled to the closed end 455 of the first chamber 415 via a friction fit. For example, the first retainer 480 may be seated within a notch formed in the closed end 455 of the first chamber 415. In such instances, no adhesives or mechanical fasteners are needed to hold the first retainer 480 in place while the pedal emulator 120 is in the relaxed state. In other instances, the first retainer 480 is coupled to the closed end 455 of the first chamber 415 using adhesives and/or mechanical fasteners.

As also shown in FIGS. 4 and 5, the first stage spring 465B and the third stage spring 475 are disposed within the second chamber 420 defined by the inner housing portion 410. The relaxed, or uncompressed, length of the first stage spring 465B is longer than the relaxed length of the third stage spring 475. Accordingly, as shown in FIG. 4, when the pedal emulator 120 is in a relaxed, or uncompressed, state, the first stage spring 465B is held in place between the piston cap 460 and the closed end 485 of the first chamber 415. That is, a first end of the first stage spring 465B abuts against the closed end 485 of the second chamber 420 and a second end of the first stage spring 465B abuts against the piston cap 460 while the pedal emulator 120 is in the relaxed state. By this regard, no mechanical fasteners or adhesives are used to hold the first stage spring 465B in place within the first chamber 420. Rather, as shown, the first stage spring 465B is merely held in place by the tensile force applied by the first stage spring 465B onto the closed end 485 of the second chamber 420 and the piston cap 460. Accordingly, the pedal emulator 120 can be manufactured at a reduced cost and complexity when compared to pedal emulators that include various additional components.

Unlike the first stage spring 465B, the third stage spring 475 is not long enough to contact both the closed end 485 of the second chamber 420 and the piston cap 460 while the pedal emulator 120 is in the relaxed state. Rather, as shown in FIG. 4, a first end of the third stage spring 475 is held in place by a second retainer 490 disposed at the closed end 485 of the second chamber 420 while a second end of the third stage spring 475 is spaced apart from the piston cap 460 by a second distance $X_2$. The second distance $X_2$ is larger than the first distance $X_1$, and the inner housing portion 410 travels the second distance $X_2$ into the first chamber 415 during compression of the pedal emulator 120 before the third stage spring 475 engages the piston cap 460. In some instances, the second retainer 490 is coupled to the closed end 485 of the second chamber 420 via a friction fit. For example, the second retainer 490 may be seated within a notch formed in the closed end 485 of the second chamber 420. In such instances, no adhesives or mechanical fasteners are needed to hold the second retainer 490 in place while the pedal emulator 120 is in the relaxed state. In other instances, the second retainer 490 is coupled to the closed end 485 of the second chamber 420 using adhesives and/or mechanical fasteners.

In some instances, the first stage springs 465A, 465B are implemented as springs that have approximately the same spring constant. In other instances, the first stage springs 465A, 465B have different spring constants. In some instances, the second stage spring 470 has a spring constant that is greater than the respective spring constants of the first stage springs 465A, 465B. In such instances, the second stage spring 470 has a stronger spring characteristic than the first stage springs 465A, 465B. In some instances, the third stage spring 475 has a spring constant that is greater than the respective spring constants of the first stage springs 465A, 465B and the second stage spring 470. Accordingly, in such instances, the third stage spring 475 has the strongest spring characteristic when compared to the first stage springs 465A, 465B and the second stage spring 470.

As described above, the pedal emulator 120 outputs a counter-force $F_c$ that mimics the feel of a conventional brake pedal when actuated by the pedal arm 110 during a braking event. The counter-force $F_c$, which is modeled by the force curve 300 shown in the illustrated example of FIG. 3, varies with respect to travel of the inner housing portion 410 into the first chamber 415. As shown in FIG. 3, the force curve 300 exhibits two inflection points, such that the rate of change of the counter-force $F_c$ varies non-linearly through full compression of the spring system included in the pedal emulator 120. As further shown in FIG. 3, the counter-force $F_c$ output by the pedal emulator 120 includes three stages: a first stage force response, a second stage force response, and a third stage force response. As used herein, the term "force response" means the cumulative counter-force $F_c$ produced by the pedal emulator 120 through a given amount of travel of the inner housing portion 410. It should be understood that the counter-force $F_c$ produced by the pedal emulator 120 is approximately equal in magnitude and opposite in direction to the amount of braking force $F_b$ applied to the pedal emulator 120.

The first stage force response of the pedal emulator 120 is provided by the first stage springs 465A, 465B compressed in parallel. The second stage force response of the pedal emulator 120 is provided by the first stage springs 465A, 465B compressed in parallel with the second stage spring 470. The third stage force response of the pedal emulator 120 is provided by the first stage springs 465A, 465B, the second stage spring 470, and the third stage spring 475 compressed in parallel with each other. Each force response stage is discussed below in connection with FIG. 3 and FIGS. 6-9, in which a braking force $F_b$ applied to the pedal emulator 120 is depicted.

Figure 6:
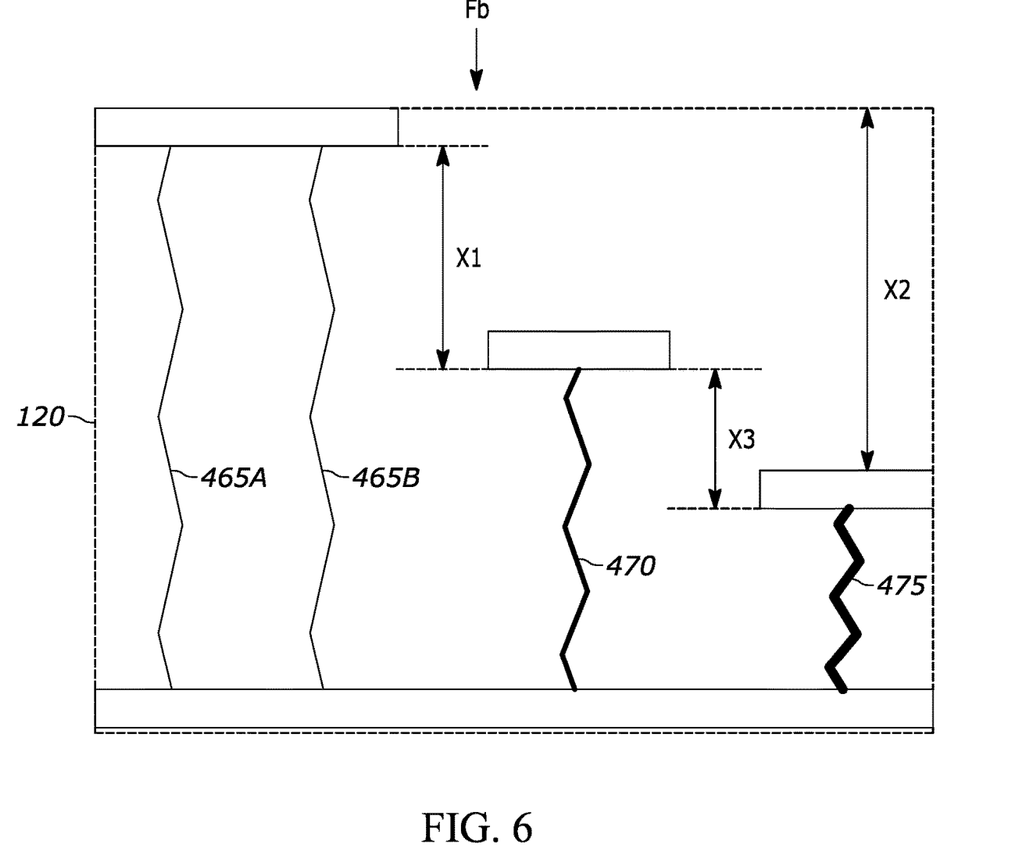
FIG. 6 is a spring diagram of a pedal emulator when no braking force is applied to the pedal emulator, according to some examples.

FIG. 6 illustrates the spring system included in pedal emulator 120 just before a braking force $F_b$ is applied to the pedal emulator 120. Before any braking force $F_b$ is applied to the pedal emulator 120 by the pedal arm 110, the pedal emulator 120 is in a relaxed, or uncompressed, state. Consequently, the pedal emulator 120 outputs little to no counter-force $F_c$ while in the relaxed state. Upon the application of a braking force $F_b$ to the uncompressed pedal emulator 120, the pedal emulator 120 outputs a first stage force response. The first stage force response is produced as the first stage springs 465A, 465B are compressed in parallel for the first distance $X_1$. That is, the first stage springs 465A, 465B output, in parallel, a counter-force $F_c$ in accordance with the first stage of the force curve 300 while the inner housing portion 410 travels the first distance $X_1$ into the first chamber 415.

For example, the first stage spring 465A is compressed between the closed end 455 of the first chamber 415 and the gland 440, and the first stage spring 465B is compressed between the closed end 485 of the second chamber 420 and the piston cap 460 during the first stage force response of the pedal emulator 120. However, neither the second stage spring 470 nor the third stage spring 475 are engaged and/or compressed during the first stage force response of the pedal emulator 120. As further shown in FIG. 3, the first stage counter-force $F_c$ increases with the linear travel of the inner housing portion 410 into the first chamber 415. Therefore, the first stage force response of the pedal emulator 120 is dependent upon the position of the inner housing portion 410 and the respective spring constants of the parallel-connected first stage springs 465A, 465B.

Figure 7:
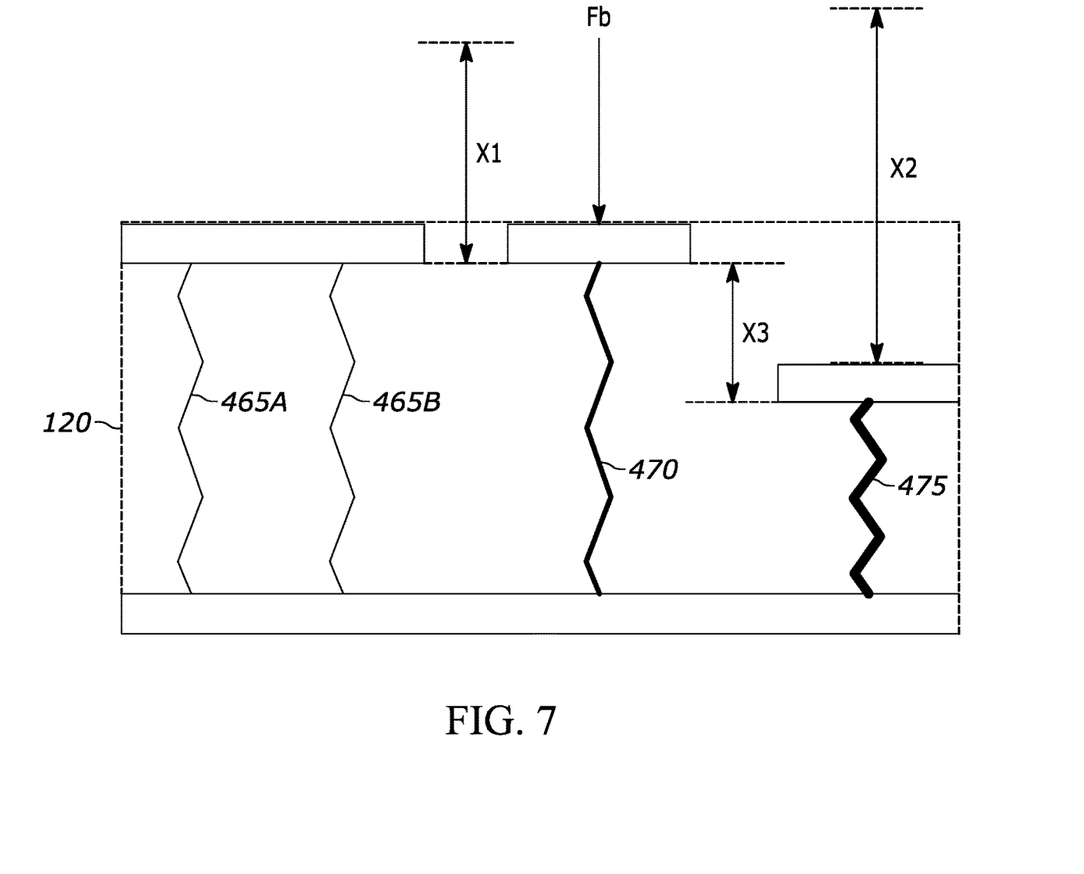
FIG. 7 is a spring diagram of the pedal emulator compressed by a first amount, according to some examples.

Once the inner housing portion 410 travels the first distance $X_1$ into the first chamber 415, the counter-force $F_c$ output by the pedal emulator 120 reaches a first inflection point at which the gland 440 engages the second stage spring 470. Referring now to FIGS. 3 and 7, the continued input of the braking force $F_b$ results in the second stage force response of the pedal emulator 120. The second stage force response is produced by the first stage springs 465A, 465B and the second stage spring 470 compressed in parallel for the third distance $X_3$, where $X_3$ is the difference between the first and second distances $X_1$, $X_2$. That is, the first stage springs 465A, 465B and the second stage spring 470 output, in parallel, a counter-force $F_c$ in accordance with the second stage of the force curve 300 as the inner housing portion 410 travels the third distance $X_3$ past the first distance $X_1$ into the first chamber 415.

For example, the first stage spring 465A and second stage spring 470 are compressed between the closed end 455 of the first chamber 415 and the gland 440, and the first stage spring 465B is compressed between the closed end 485 of the second chamber 420 and the piston cap 460 during the second stage force response of the pedal emulator 120. However, the third stage spring 475 is not engaged and/or compressed during the second stage force response of the pedal emulator 120. Also, as shown in FIG. 3, the second stage counter-force $F_c$ increases, at a faster force rate (e.g., force per unit travel) than that of the first stage counter-force $F_c$, with the linear travel of the inner housing portion 410 into the first chamber 415. Therefore, the second stage force response of the pedal emulator 120 is dependent upon the position of the inner housing portion 410 and the respective spring constants of the parallel-connected first stage springs 465A, 465B and second stage spring 470.

Figure 8:
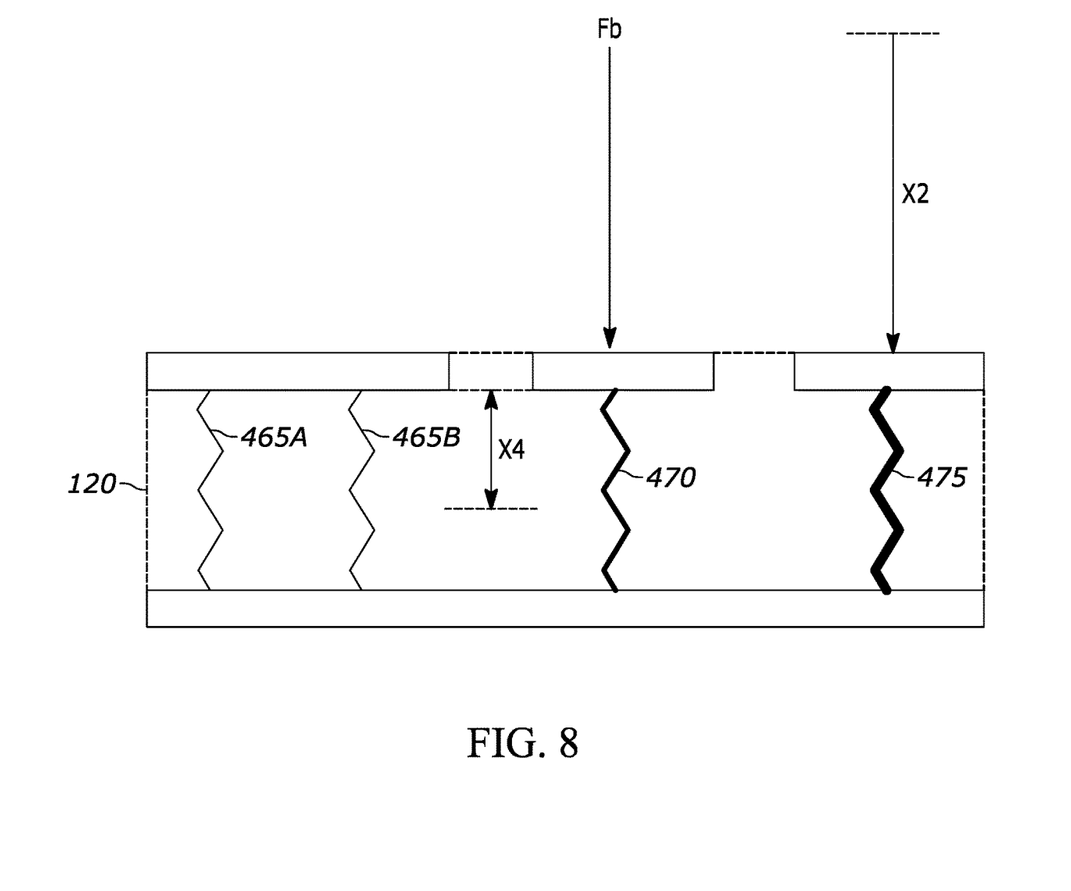
FIG. 8 is a spring diagram of the pedal emulator compressed by a second amount, according to some examples.
Figure 9:
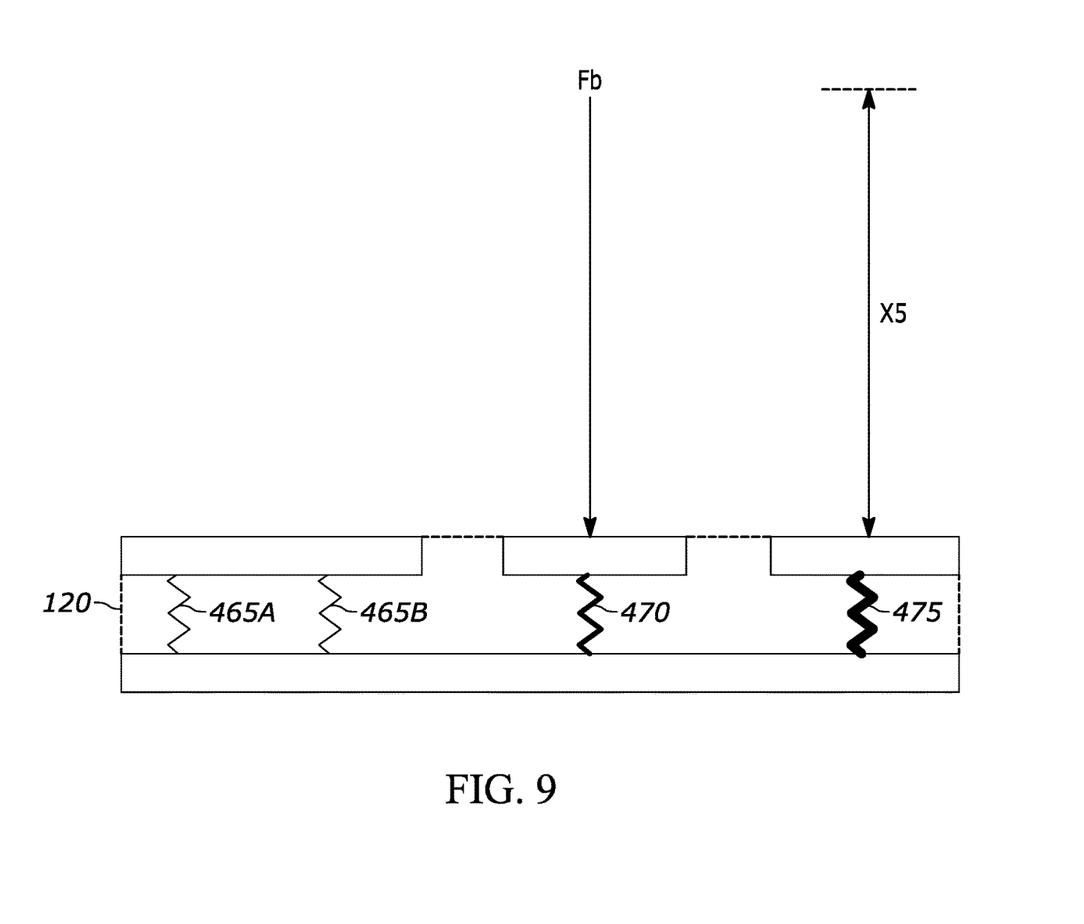
FIG. 9 is a spring diagram of a fully compressed pedal emulator, according to some examples.

Once the inner housing portion 410 travels the second distance $X_2$ into the first chamber 415, the counter-force $F_c$ output by the pedal emulator 120 reaches a second inflection point at which the third stage spring 475 engages the piston cap 460. Referring now to FIGS. 3 and 8, the continued input of the braking force $F_b$ results in the third stage force response of the pedal emulator 120. The third stage force response is produced by the first stage springs 465A, 465B, the second stage spring 470, and the third stage spring 475 compressed in parallel for a fourth distance $X_4$. That is, the first stage springs 465A, 465B, the second stage spring 470, and the third stage spring 475 output, in parallel, a counter-force $F_c$ in accordance with the third stage of the force curve 300 as the inner housing portion 410 travels the fourth distance $X_4$ past the second distance $X_2$ into the first chamber 415.

For example, the first stage spring 465A and second stage spring 470 are compressed between the closed end 455 of the first chamber 415 and the gland 440, and the first stage spring 465B and the third stage spring 475 are compressed between the closed end 485 of the second chamber 420 and the piston cap 460 during the third stage force response of the pedal emulator 120. As shown in FIG. 3, the third stage counter-force $F_c$ increases, at a faster force rate than that of the first and second stage counter-forces $F_c$, with the linear travel of the inner housing portion 410 further into the first chamber 415. Therefore, the third stage force response of the pedal emulator 120 is dependent upon the position of the inner housing portion 410 and the respective spring constants of the parallel-connected first stage springs 465A, 465B, second stage spring 470, and third stage spring. Once the inner housing portion 410 travels the fourth distance $X_4$ into the first chamber 415 during the third stage force response, the pedal emulator 120 becomes fully compressed (FIG. 9) at which point the inner housing portion 410 has traveled a total distance of $X_5$.

As described above, the pedal emulator 120 includes two first stage springs 465A, 465B connected in parallel. The two first stage springs 465A, 465B provide redundancy such that failure of one of the first stage springs 465A, 465B does not have a significant negative impact on performance of the pedal emulator 120. However, in some instances, the pedal emulator 120 includes only a single first stage spring 465. In some instances, the pedal emulator 120 also includes redundant second and/or third stage springs 470, 475 similar to the redundant first stage springs 465A, 465B described herein. In some instances, the pedal emulator 120 includes additional stages of springs, such as fourth, fifth, and/or sixth stage springs. In such instances, the pedal emulator 120 experiences additional stages of force response during operation of the brake pedal assembly 100.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

I claim:

1. A pedal emulator comprising:
   a housing including:
      a first housing portion that defines a first chamber; and
      a second housing portion that defines a second chamber, the second housing portion moveable relative to the first housing portion;
   a first spring that is compressed while the second housing portion travels a first distance relative to the first housing portion;
   a second spring that is compressed in parallel with the first spring after the second housing portion travels the first distance and while the second housing portion travels a second distance relative to the first housing portion; and
   a third spring that is compressed in parallel with the first spring and the second spring after the second housing portion travels the second distance and while the second housing portion travels a third distance relative to the first housing portion,
   wherein the first spring and the second spring are contained within the first chamber; and
   wherein the second spring is engaged by the second housing portion after the second housing portion travels the first distance relative to the first housing portion.

2. The pedal emulator of claim 1, wherein an open end of the second housing portion is received by an open end of the first housing portion; and
wherein the open end of the second housing portion is sealed by a gland.

3. The pedal emulator of claim 2, wherein the first spring is compressed between the gland and a closed end of the first housing portion as the second housing portion travels the first distance; and
wherein the second spring is compressed in parallel with the first spring between the gland and the closed end of the first housing portion after the second housing portion travels the first distance.

4. The pedal emulator of claim 2, further comprising a piston including:
a shaft that extends from the first chamber into the second chamber through an aperture formed in the gland; and
a cap fitted on the end of the shaft disposed in the second chamber, the cap abutting against the gland before the second housing portion travels relative to the first housing portion.

5. The pedal emulator of claim 4, wherein the first and second springs are arranged coaxially along the shaft.

6. The pedal emulator of claim 4, wherein the third spring is contained within the second chamber; and
wherein the third spring is compressed between the cap and a closed end of the second housing portion after the second housing portion travels the second distance relative to the first housing portion.

7. The pedal emulator of claim 4, further comprising a fourth spring contained within the second chamber; and
wherein the fourth spring is compressed in parallel with the first spring as the second housing portion travels the first distance relative to the first housing portion.

8. The pedal emulator of claim 1, wherein a first end of the second spring is coupled to a first retainer that is disposed at a closed end of the first chamber and a second end of the second spring is spaced the first distance from the second housing portion in a fully relaxed position of the pedal emulator; and
wherein a first end of the third spring is coupled to a second retainer that is disposed at a closed end of the second chamber.

9. The pedal emulator of claim 1, wherein a spring constant of the third spring is greater than a spring constant of the first spring and a spring constant of the second spring.

10. A brake pedal assembly comprising:
a brake pedal;
a bracket;
a pedal arm rotatably coupled between the brake pedal and the bracket, the pedal arm arranged to rotate in response to application of a force to the brake pedal; and
a pedal emulator that is compressed by the pedal arm as the pedal arm rotates, the pedal emulator including:
a housing including a first housing portion and a second housing portion arranged to travel relative to the first housing portion when the pedal arm rotates;
a first spring that is compressed while the second housing portion travels a first distance relative to the first housing portion;
a second spring that is compressed in parallel with the first spring after the second housing portion travels the first distance and while the second housing portion travels a second distance relative to the first housing portion; and
a third spring that is compressed in parallel with the first spring and the second spring after the second housing portion travels the second distance and while the second housing portion travels a third distance relative to the first housing portion,
wherein the first spring and the second spring are contained within a first chamber defined by the first housing portion; and
wherein the second spring is engaged by the second housing portion after the second housing portion travels the first distance relative to the first housing portion.

11. The brake pedal assembly of claim 10, wherein an open end of the second housing portion is received by an open end of the first housing portion; and
wherein the open end of the second housing portion is sealed by a gland.

12. The brake pedal assembly of claim 11, wherein the first spring is compressed between the gland and a closed end of the first housing portion as the second housing portion travels the first distance; and
wherein the second spring is compressed in parallel with the first spring between the gland and the closed end of the first housing portion after the second housing portion travels the first distance.

13. The brake pedal assembly of claim 11, wherein the second housing portion defines a second chamber.

14. The brake pedal assembly of claim 13, further comprising a piston including:
a shaft that extends from the first chamber into the second chamber through an aperture formed in the gland; and
a cap fitted on the end of the shaft disposed in the second chamber, the cap abutting against the gland before the second housing portion travels relative to the first housing portion.

15. The brake pedal assembly of claim 14, wherein the third spring is contained within the second chamber; and
wherein the third spring is compressed between the cap and a closed end of the second housing portion after the second housing portion travels the second distance relative to the first housing portion.

16. The brake pedal assembly of claim 14, further comprising a fourth spring contained within the second chamber; and
wherein the fourth spring is compressed in parallel with the first spring as the second housing portion travels the first distance relative to the first housing portion.

17. The brake pedal assembly of claim 10, wherein a first end of the second spring is coupled to a first retainer that is disposed at a closed end of the first chamber and a second end of the second spring is spaced the first distance from the second housing portion in a fully relaxed position of the pedal emulator; and
wherein a first end of the third spring is coupled to a second retainer that is disposed at a closed end of the second chamber.

18. The brake pedal assembly of claim 10, wherein a spring constant of the third spring is greater than a spring constant of the first spring and a spring constant of the second spring.

* * * * *